United States Patent [19]

Davies

[11] Patent Number: 4,780,589

[45] Date of Patent: Oct. 25, 1988

[54] ROLLER ELECTRODES FOR ELECTRIC-RESISTANCE WELDING MACHINE

[76] Inventor: Joseph R. Davies, 220 W. Haven, New Lenox, Ill. 60451

[21] Appl. No.: 53,375

[22] Filed: May 22, 1987

[51] Int. Cl.⁴ .............................................. B23K 11/06
[52] U.S. Cl. ......................................... 219/84; 219/64
[58] Field of Search ........................ 219/81, 82, 84, 64

[56] References Cited

U.S. PATENT DOCUMENTS

| | | | |
|---|---|---|---|
| 3,501,611 | 3/1970 | Opprecht | 219/84 |
| 4,188,523 | 2/1980 | Kawai et al. | 219/84 X |
| 4,433,229 | 2/1984 | Morikawa et al. | 219/84 |
| 4,642,437 | 2/1987 | Yamamoto et al. | 219/84 |

FOREIGN PATENT DOCUMENTS

| | | | |
|---|---|---|---|
| 2351534 | 3/1975 | Fed. Rep. of Germany | 219/84 |
| 2805345 | 8/1979 | Fed. Rep. of Germany | 219/84 |
| 3432499 | 4/1985 | Fed. Rep. of Germany | 219/81 |
| 0001583 | 1/1982 | Japan | 219/84 |
| 597971 | 4/1978 | Switzerland | 219/81 |

OTHER PUBLICATIONS

Spengler, "Niedrigschmelzende Metalle und Legierungen", *Metall* publication (1955).

Primary Examiner—E. A. Goldberg
Assistant Examiner—Lincoln Donovan
Attorney, Agent, or Firm—Charles F. Lind

[57] ABSTRACT

A roller electrode combination for use in electric-resistance welder, the electrode having relatively rotatable components separated by very small gaps, and a liquid contained by the components across the gaps; where said liquid is nontoxic, and is highly conductive, both electrically and thermally. The conductive liquid is of a composite eutectic mixture of gallium (Ga), indium (In), tin (Sn) and zinc (Zn), by weight, being approximately 61% Ga, 25% In, 13% Sn, and 1% Zn. A protective coating of the order between 0.0025 and 0.025 millimeters thick is plated on said surfaces of at least one of the components, being of material from the platinum family, such as rhodium (Rh). Coolant is circulated through one of the components; and part of the component is formed of a composite mixture of copper (Cu) and tungsten (W). That one component further may have a circumferentially continuous raised rib, on the exterior peripheral face adapted to be closely adjacent and directly engage at least the adjacent of the overlapped edges of the material to be welded.

22 Claims, 3 Drawing Sheets

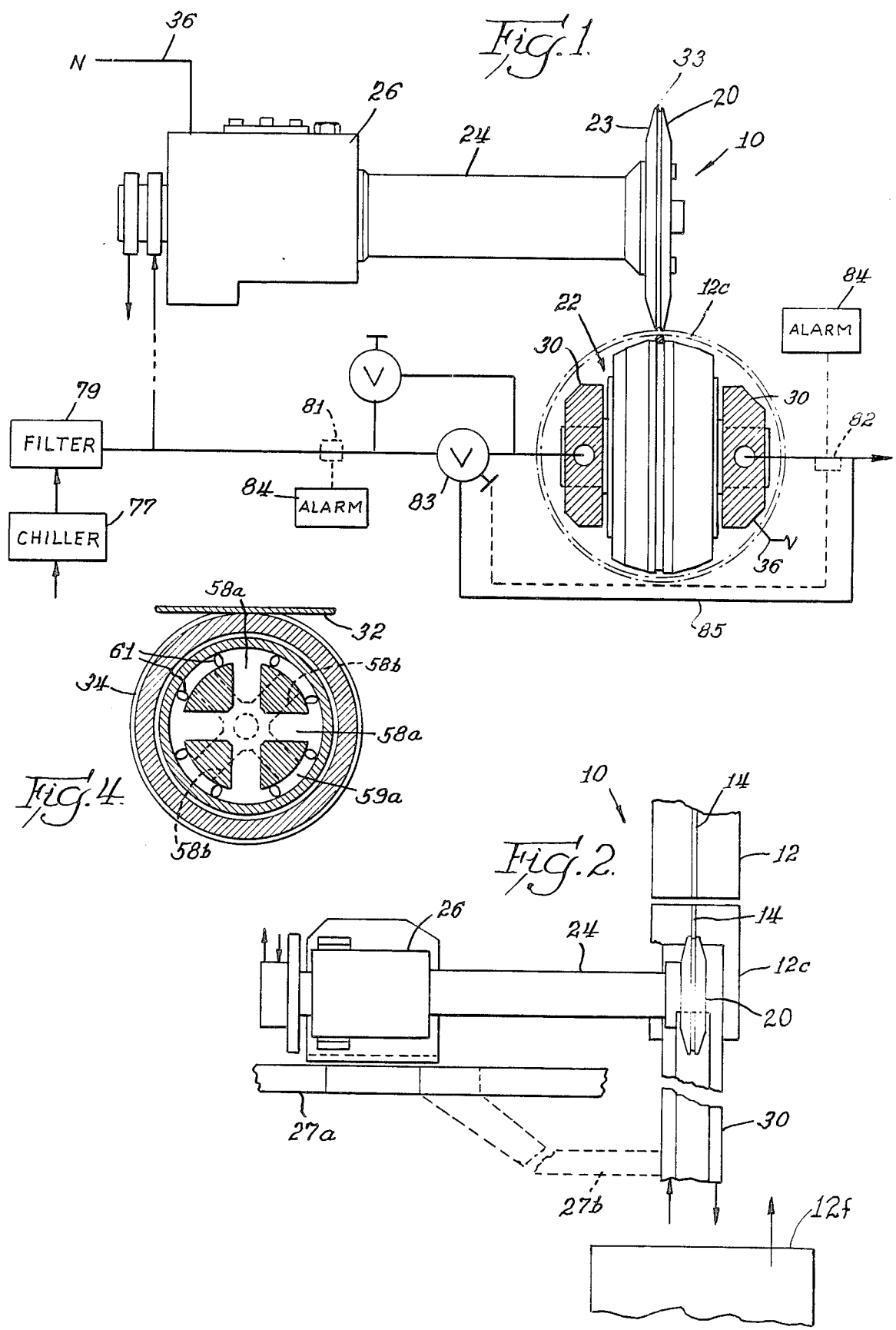

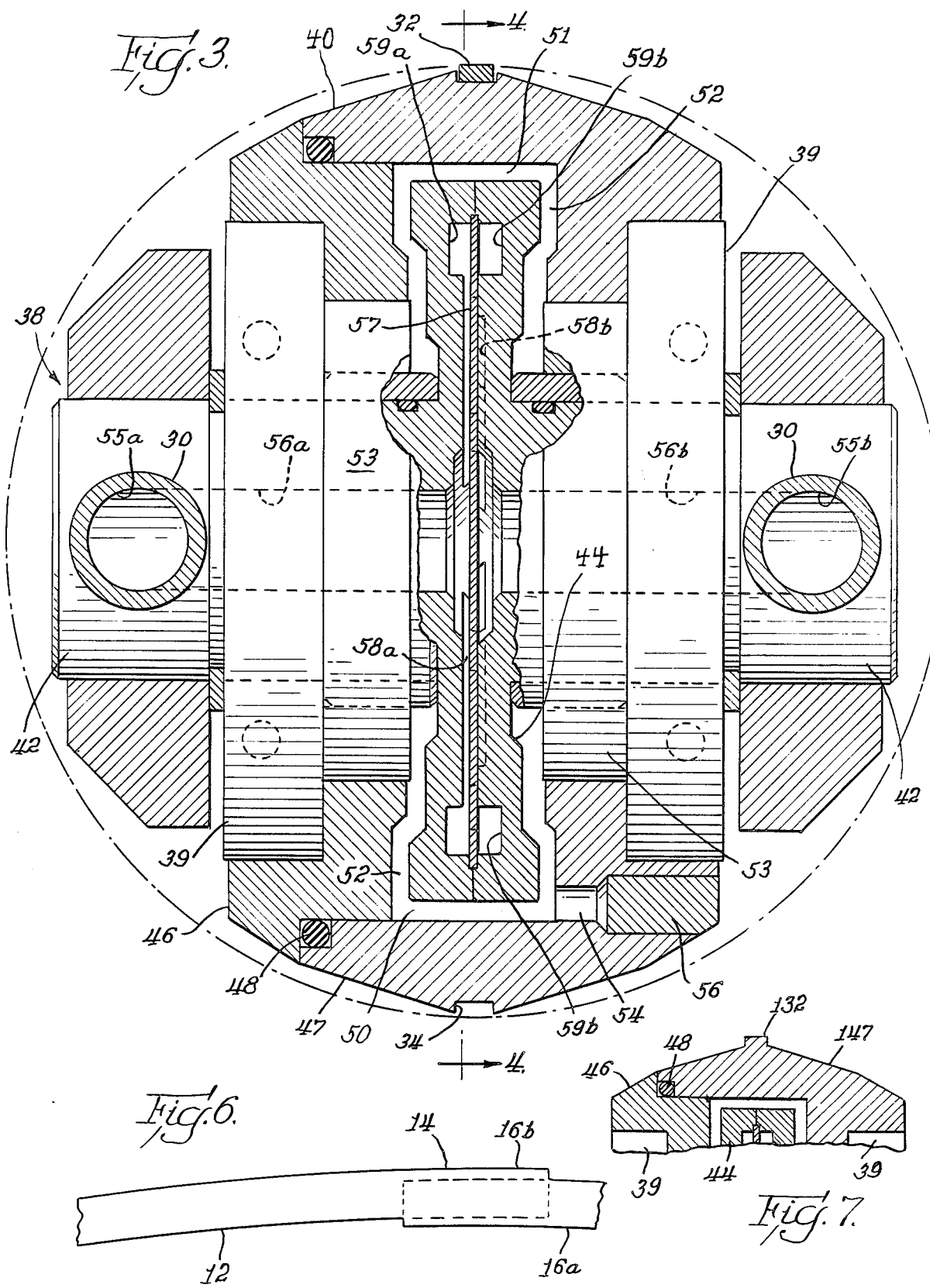

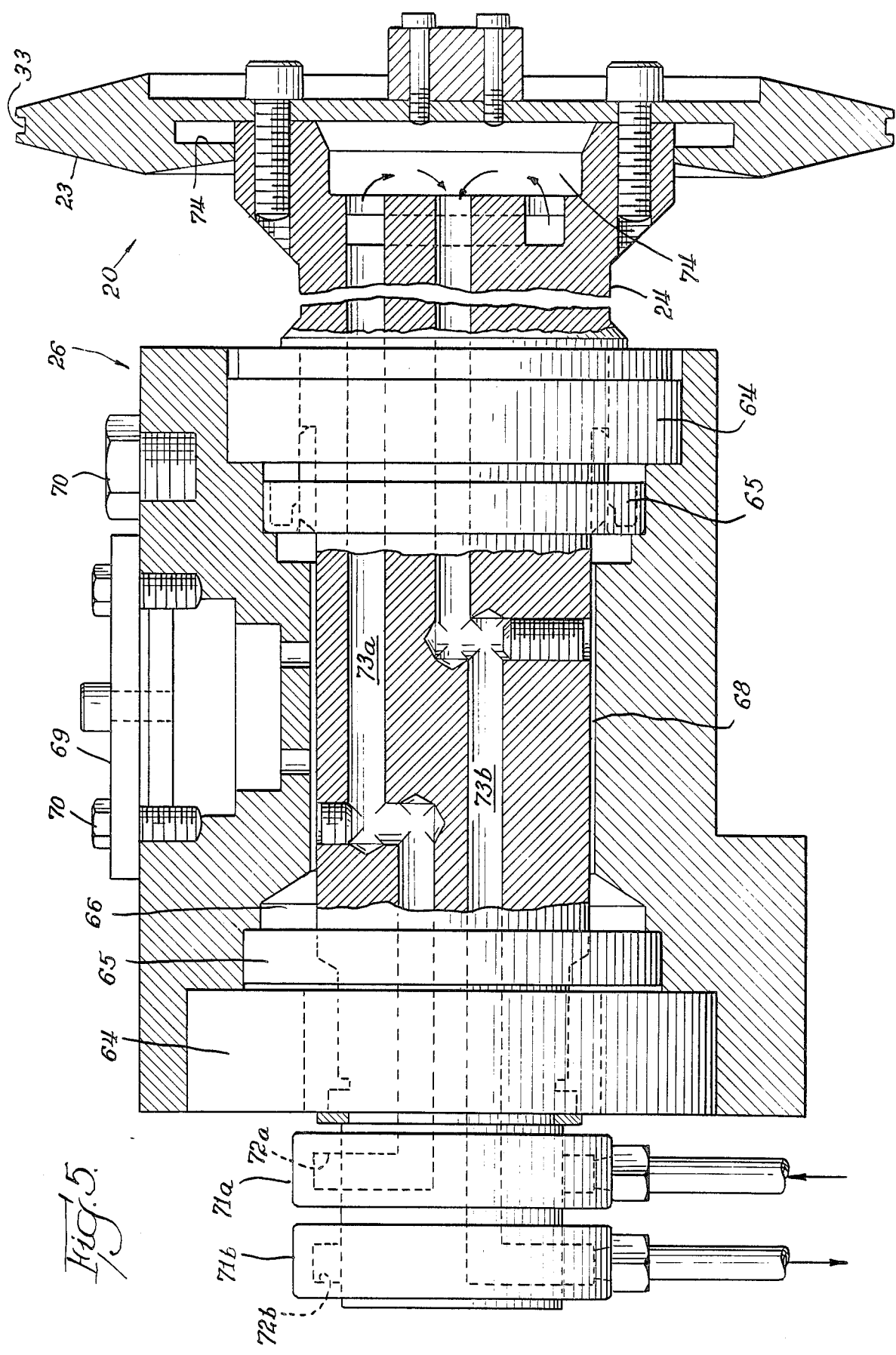

ROLLER ELECTRODES FOR ELECTRIC-RESISTANCE WELDING MACHINE

FIELD OF THE INVENTION

This invention relates to electric-resistance welding machines or welders, particularly to roller electrodes used in such, the electrodes being of the type having stationary and rotatably mounted components separated by clearance gaps; and an electrically and thermally conductive liquid contained by the components to bridge the gaps, to conduct a welding current between the two components, and also to cool one of the components via a coolant flowing through the other component.

BACKGROUND OF THE INVENTION

Metal cans are fabricated by forming a flat metal blank, usually rectangular in shape, into a tubular configuration with the lateral ends or edges being lapped and welded together, defining a longitudinal seam. End closures are then secured across the open ends of the tubular configuration to complete the can formation. The term "tubular" is not restricted to a circular cross-section, as square or other shaped cans may be fabricated with this same approach. Also, similar continuously welded seams may be used for fabricating structural components other than cans.

One form of seam weld is made as opposed roller electrodes, one on the inside and one on the outside of the tubular configuration, continuously track along in the direction of the lapped ends. A large welding current is transmitted between the roller electrodes, via the small regions of contact defined between the opposing roller electrodes, between and through the lapped ends. The current is pulsed, to provide that the welded seam is actually comprised of a series of "spot welds", made closely adjacent one another.

With a tin-plated steel blank, a copper wire intermediate electrode, typically of rectangular cross-section, is fitted in a circumferential groove on each roller electrode, and pressed then against the opposite sides of the lapped ends. This serves to help carry the melted tin away from the welded seam region; although the tin does tend to solidfy and build up on the roller electrode, and in the groove. Tin buildup increases the electrical resistance (compared to a new roller electrode), and reduces the effective welding current . . . resulting in erractic or even poor welds. This tin buildup periodically can be removed, by machining or "reprofiling" the periphery and groove of the roller electrode. As the roller electrodes must have specific minimum overall diameters and contact angles, reprofiling may be done only a limited number of times; thereafter, the roller electrode must be replaced.

One form of roller electrode of this type commonly has a stator supported by the welding machine, and a rotor rotatably carried on the stator and having a circumferential guide groove for the copper wire. The rotor and stator are separated from one another by very small radial and circumferential clearance gaps (some possibly only 0.6 of a millimeter wide), across which the relative movement of the rotor and stator takes place. An electrically conductive liquid is sealed in the roller electrode, spanning substantial portions of the gaps, to conduct the welding current between the stator and rotor components. Appropriate bearings and surrounding insulators support relative rotation of the stator and rotor components, but otherwise electrically insulate these components from one another.

One form of roller electrode cooling provides for circulating a coolant liquid, commonly water charged with an anti-freeze, through passages defined in the stator. This cools the stator surfaces exposed to the electrically conductive liquid, and the electrically conductive liquid in turn then also serves to thermally cool the rotor.

The stator and rotor components of the roller electrode are commonly formed of a copper alloy having a high content (possibly 98%) of copper, for yielding high electrical and thermal conductivity. Such an alloy also structurally resists deformation under the welding temperataures and pressures.

Modern welding equipment may weld with 6000 amperes of current at up to 40-50 kilowatts of power, giving a linear welding speed of 70 meters per minute, and yielding a production up to 600 cans per minute.

The electrically and thermally conductive liquid almost universally used in commercial roller electrodes has been mercury. Mercury remains a liquid to approximately $-38°$ C., unequaled by any other conductive metal or eutectic mixture of metals, that is also stable at room temperatures. Mercury can carry the high welding currents needed in the roller electrode, and mercury can also provides sufficient cooling for the rotor.

Despite its wide use, mercury is not a willing first choice; in fact it has many very poor if not outright dangerous characteristics.

For example, mercury has electrical and thermal conductivities of approximately only 2% that of cooper. The limited wetting ability of mercury adds to the reduced effectiveness of both electrical and thermal transmission between the stator and rotor components. Consequently, its presence: adds appreciably to the electrical current needed to generate the welding temperatures, which raises both the operating temperatures and cooling requirements; and gives off heat to the stator so poorly that the stator coolant may be heated only a few degrees in passing through the roller electrode, despite being chilled to below room temperature, possibly between $5°-15°$ C. Moreover, the thermal expansion of mercury in the anticipated temperature range of use, $0°-100°$ C., is very large, so that complicated seals and/or overflow devices must be associated with the roller electrodes to accomodate this expansion.

Mercury is also very corrosive to the copper alloy stator and rotor components, producing an amalgam that limits both the shelf and operating lives of the roller electrode, to perhaps only several weeks. The amalgam, in its initial stage is paste-like, to increase drag against electrode rotation; whereas in its more advanced stages, it solidifies rock-hard to bind the components together completely. Once solidified, it is typically impossible to dislodge the amalgam and disassemble the electrode components, such as for rebuilding and salvaging them for a second work cycle. The amalgam has poorer electrical and thermal conductivities than fresh mercury, correspondingly imposing ever higher welding currents and cooling demands.

Attempts to extend the shelf life provide that the mercury roller electrode may be maintained under refrigeration and/or repositioned frequently. Also, manufactureres may ship the roller electrodes empty, with a separate supply of the mercury the user must pour into the roller electrode and seal, when the need arises.

Toxicity of mercury however, remains probably its most significant drawback, from a liability standpoint. Mercury is frequently looked upon as a substance requiring special standards of care, and government approvals for its wide scale use. Such restrains detract from the appeal of having the user fill the roller electrode with the mercury and/or add appreciably to the overall costs associated with its use in roller electrodes. Mercury leaks to the enviroment, or even the threat of it, can be unsettling.

Other electrically conductive liquids have been proposed, to avoid the above-mentioned problems of mercury. However, such generally have not found commercial application, because the roller electrode had to be modified so much that it would not work in conventional welding machines; or the current carrying capacity of the liquid was inadequate for the high output welding demands.

The basic roller electrode is disclosed in U.S. Pat. No. 3,501,611; and non-mercury electrically conductive liquids are disclosed in U.S. Pat. Nos. 4,188,523 (69.5+or−5 Atomic % of gallium, 15.2+or−1.0 Atomic % indium, 6.1+or−1.0 Atomic % tin, 4.5+or−0.8 Atomic % zinc, 3.2+or−0.5 Atomic % silver, and 1.5+or−0.5 Atomic % aluminum; and 4,433,229 (pure gallium, or bianary metals of gallium including gallium/indium and gallium/tin).

SUMMARY OF THE INVENTION

The present invention provides improved mercury-free roller electrodes for use in electric-resistance welders, the electrodes having a substantially nontoxic highly conductive (both electrically and thermally) liquid contained by the components across the very small rotational gaps between the components. Moreover, a protective plating on the hotter of the components exposed to the conductive liquid, further inhibits corrosion and lengthens the operating life. Low thermal expansion of the contained liquid reduces the demands of the containing seals; and the electrode has an almost endless shelf life, and a greatly extended operating life.

The present invention provides a roller electrode having electrically and thermally conductive liquid of a composite eutectic mixture of gallium (Ga), indium (In), tin (Sn) and zinc (Zn). The specific composition, by weight, is approximately 61% Ga, 25% In, 13% Sn, and 1% Zn.

The present invention also provides having the hotter rotor surfaces, that will be exposed to the conductive liquid, plated with a very thin layer of: (1) rhodium (Rh); or (2) gold (Au) first and rhodium (Rh) over the gold. The rhodium is exposed externally, and inhibits attack of the component surface by the contained conductive liquid. Instead of rhodium, other members of the platinum family may be used, including platinum (Pu), iridium (Ir), palladium (Pt), ruthenium (Ru) or osmium (Os), particularly when balancing conductivity against costs.

The present invention also provides improved controls in the coolant system, including fine filters to clean the coolant, and temperature sensors and/or diverting valves to provide for the operation of the roller electrodes only in the proper temperature ranges.

The present invention also provides a roller electrode having a rotor formed in part of a composite sintered mixture of copper (Cu) and tungsten (W), being in the range of 60–70% tungsten and 40–30% copper by weight. This provides increased rotor strength against deformation and mechanical wear, resistance to corrosive attack by the contained conductive liquid, and increased resistance against bonding of tin to said rotor, to minimize detrimental tin buildup on the exposed surface of the roller electrode. Other refractory metals, such as molybdenum (Mo), having good electrical conductivity may also be used instead of tungsten, particularly when balancing the durability against the costs.

BRIEF DESCRIPTION OF THE DRAWINGS

The disclosure of the present invention includes the accompanying drawings, in which:

FIG. 1 is an elevational-type sectional view of electric-resistance welding equipment, taken generally in a direction axially in line with the formation of a tubular can, and illustrating a can blank in phantom and the inner and outer roller electrodes cooperating therewith;

FIG. 2 is a top plan-type view of FIG. 1;

FIG. 3 is an enlarged sectional view, as seen from the same line of sight as FIG. 1, except through the center of an inner roller electrode used on the electric-resistance welding equipment of FIGS. 1 and 2;

FIG. 4 is a reduced sectional view taken generally from line 4—4 in FIG. 3;

FIG. 5 is an enlarged sectional view, as seen from the same line of sight as FIG. 1, except through the interior of an outer roller electrode used on the electric-resistance welding equipment of FIGS. 1 and 2;

FIG. 6 is a greatly enlarged sectional view, similar to FIG. 1, illustrating the seam weld formed in the mated edges of the can blank; and FIG. 7 is a transverse sectional view of a modified roller electrode.

DETAILED DESCRIPTION OF ILLUSTRATED EMBODIMENTS

In FIGS. 1 and 2, appropriate roller electrode components of an electric-resistance welder 10 are illustrated, adapted to weld can blanks 12 along longitudinal seams 14, formed where opposite ends 16a and 16b (see FIG. 6) of each blank are overlapped slightly. The can blanks 12 typically will start out flat (as illustrated as 12f in FIG. 2), and will be moved in somewhat spaced edge-to-edge relation, in the direction of the seams 14, and will be reshaped by conventional reforming structure (not shown) to a tubular configuration 12c (shown in phantom only in FIG. 1) with the blank ends overlapped. Outer and inner roller electrodes 20 and 22, respectively identified relative to the tubular configuration 12c of the formed can blank 12, bear against the blank ends at the seam 14.

The outer roller electrode 20 has a disc-like member 23 keyed to an elongated shaft 24, at one end thereof; and the shaft at its opposite end is rotatably mounted at bearing housing 26. The bearing housing 26 is adjustably secured to frame 27a of the welding equipment 10, to orient the shaft 24 substantially perpendicular to the movement of the blanks 12 and the formation of the seams 14. The inner roller electrode 22 is mounted at one end of an elongated arm 30 that extends axially of the movement of the can blanks 12; and the arm 30 at the opposite end is adjustably supported relative to frame 27b of the welding equipment 10, where the blanks are flat or justs beginning to be reshaped to be tubular. The inner roller electrode 22 will thus be located at the downstream end of the arm 30, relative to the direction of movement of the blanks 12.

Generally, a copper wire 32 is fitted in annular grooves 33 and 34, respectively in the roller electrodes 20 and 22, to bear directly against the overlapped blank ends 16a ad 16b; but only the inner electrode wire 32 received in electrode groove 34 is illustrated in FIGS. 3 and 4. A plused welding current is carried between appropriate conductors 36 (FIG. 1), via the outer roller 20, the sandwiching copper wires 32 and the overlapped can blank ends 16a and 16b, the inner roller 22, and the support arm 30.

FIGS. 3 and 4 illustrate the inner roller electrode 22 in greater detail, the electrode having a stator 38, and a rotor 40 supported by sealed bearings 39 to rotate on the stator 38 about an axis disposed transverse to the arms 30. The stator 38 may be of a unitary construction, including extended ends 42 keyed nonrotatably to the inner roller electrode supported arm 30, and a central disc 44 between the extended ends 42. The rotor 40 typically has two adjacent sections 46 and 47 press-fit or otherwise secured together and sealed by O-ring 48 at the overlapping joint.

The joined rotor sections 46 and 47 define a cavity 50 larger than the stator disc 44; and the generally concentric stepped adjacent faces of each are closely spaced from one another across a peripherial gap 51 and opposed side gaps 52. Seals 53 operate between the stator 38 and rotor 40 to seal and electrically insulate these components relative to one another. An electrically and thermally conductively liquid (not shown) fills approximately 80-90% of this sealed roller interior or cavity 50, tap 54 being used for this and then closed with plug 56. The liquid bridges the gaps 51 and 52 between the stator and rotor; electrically and thermally connecting the stator 42 and rotor 44 together, while allowing relative rotation of these components.

Axially extended coolant passages 55a and 55b formed in the arm 30 communicate with one another via axial, radial and peripherial passages formed in the stator 38. In the roller electrode 22 illustrated, the stator ends 42 have axial passages 56a and 56b extended to opposite sides of a partition 57 fitted in the stator disc, and four radial passage 58a and 58b respectively on opposite sides of the partition extend between the central passages 56a and 56b, and annular passages 59a and 59b on opposite sides of the partition. As illustrated, the four radial passages 58a and 58b on each side of partition are angled approximately 90° apart; and the passages on one side are angled to lie approximately midway between the passages on the other side. Through openings 61 formed in the partition 57 connects the two annular passages 59a and 59b together, at locations approximately midway between the eight radial passages 58a and 58b.

The housing 26 illustrated in FIG. 5 has sealed bearings 64 and rotary seals 65 that cooperate to rotate the shaft about its longitudinal axis, while sealing the components together against liquid leakage and while electrically insulating the components from one another. The housing cavity 66 is larger than the shaft 24, and generally concentric adjacent faces of each are closely spaced from one another across a peripherial gap 68. An electrically conductively liquid (not shown) fills approximately 80-90% of this sealed housing interior 66, fill cap 69 being used for this and closed by bolts 70. The liquid bridges the peripherial gap 68 between the shaft 24 and housing 26; electrically connecting the components together, while allowing relative rotation between them.

Collar manifolds 71a and 71b are sealed around the shaft 24, at one end thereof adjacent the housing 26, communicating via radial passages 72a and 72b, and axially extended passages 73a and 73b formed in the shaft 24, with passages 74 formed in the disc 23 of the outer roller electrode.

Coolant may be circulated through the outer and inner roller electrode, for cooling them. As is illustrated in FIGS. 1 and 2, the coolant may be passed through a chiller 77 and a filter 79, and then in parallel through the outer and inner roller electrodes 20 and 22, respectively. In circulating through the stator 38 the coolant may enter from one passage 55a of the arm 30, pass outwardly in one set of four radial passages 58a to the one annular passage 59a, cross over via the openings 61 to the other annular passage 59b, move inwardly in the other set of four radial passages 58b, and exit via the other passage 55b of the arm 30.

The rotor 40 is cooled by the thermal conductivity of the conductive liquid, across the gaps 51 and 52 between the stator disc 44 and rotor. In modern practice, some of the coolant passages in the stator may be of very small cross-section, as small as 1.0 millimeter across; and up to possibly five gallons per minute of the coolant may be circulated through these flow passages, representing very high coolant flow velocity.

The invention provides for the use of an improved electrically and thermally conductive liquid, having many advantages over the most conventional liquid commercially used, namely mercury. The improved conductive liquid is a composed eutectic mixture of gallium (Ga), indium (In), tin (Sn) and zinc (Zn). The approximate composition, by weight, is 61% Ga, 25% In, 13% Sn, and 1% Zn.

Some important, unusual and beneficial properties of using this conductive liquid in the roller electrodes, particularly when compared to mercury, are:

1. The conductive liquid is essentially nontoxic, and provides roller electrodes safe even for forming cans intended for foodstuff.

2. The thermal expansion of the conductive liquid is relatively low, in the anticipated operating temperature range between possibly 1°-3° C. and 100°-150° C. This reduces problems of seal damage and/or overfilling the roller electrode, even up to 85-95% maximum capacity, and also allows the roller electrode, filled to this greater percentage, to provide a larger percentage of the components' surfaces wetted by and exposed to the liquid, reducing the unit density of current.

3. The corrosive reaction of the conductive liquid against copper and/or copper alloys is very low at temperatures below 100° C., which may be obtainable with proper roller electrode cooling, antipicating very long expected shelf life and operating life for such roller electrodes.

4. The conductive liquid has electrical and thermal conductivities almost four times better than mercury, and has much better "wetting" characteristic than mercury; providing that such roller electrodes product equilivent or even better welds, compared to mercury roller electrodes, at less electrical current and at reduced overall operating temperatures.

5. The conductive liquid deteriorates to a putty-like consistency . . . not a rigid solid, allowing for stator and rotor component disassembly and rebuilding, for greater overall economy.

As the disclosed conductive liquid provides overall less resistance to the welding current, less operating heat will be built up in the roller electrodes. Moreover, the disclosed conductive liquid provides overall good wetting of the interior stator and rotor surfaces, to offer good thermal cooling and electrical conductivity across the gaps between the stator and rotor. Also, an equilivent welding temperature and weld can be obtained with less overall welding current, compared to a weld made with a conventional mercury roller electrode.

Another aspect of this invention provides that the inner roller electrode is coated, on the inside surface of the rotor, as a means to reduce corrosive reaction between the conductive liquid and the copper and/or copper alloy structural material of the rotor containing the liquid. Because of the intense heat of the copper and/or/copper alloy rotor in the rim region opposite the actual welding contact, this region is most critical to corrosive attack of the conductive liquid.

In one embodiment, rhodium (Rh) is used, electroplated to a thickness of between 0.0025 and 0.025 of an millimeter. The rhodium has electrical conductively about one-third that of copper; but the minimum thickness does not appreciable add to the overall resistance of the welding current. Rhodium improves resistance against corrosive of the disclosed conductive liquid against the copper and/or copper alloy of the rotor; at even elevated operating temperatures. The rhodium coating also reduces corrosive of conventional mercury against the copper and/or copper alloy of the rotor, making it advantageous to use this rhodium coating even in a conventional mercury-filled roller electrode.

Gold may be electroplated onto the rotor surface, and the rhodium may be electroplated onto the gold. The gold has conductively of about 60% that of copper; but the minimum thickness does not appreciable add to the overall resistance against the welding current. This gold-rhodium combination will typically be more economical than plating with just rhodium. The thickness of gold may be between 0.001 and 0.0125 of a millimeter, and the thickness of rhodium may be slightly less; so that the overall plating may thus possibly be of the order of 0.0015-0.025 of a millimeter thick. As noted, rhodium provides good resistance against any corrosive reaction of the disclosed conductive liquid and/or mercury against the copper alloy rotor.

Instead of rhodium, other members of the platinum family may be used, including platinum (Pt), iridium (Ir), palladium (Pd), ruthenium (ru) or osmium (Os), particularly when balancing conductivity against costs.

To have any disclosed improved roller electrode operate properly for its expected long life, the temperature and quality of the coolant must be extensively regulated. This includes protection against impurities in the coolant, or buildup of slag, oxidation or the like on the walls of the coolant passages . . . all of which lead to reduced cooling, and the possible resultant overheating and greater corrosive activity of the liquid against the components. On the other hand, excessive cooling can also be very damaging to the operating life of the improved electrode rollers, causing the liquid to change phase at approximately 3 degrees C. Excessive cooling is possible if welding may be discontinued over any length of time, while the chiller operation and coolant flow continued, as if there was no stoppage.

As thus illustrated in FIG. 1, the coolant flow to the roller electrodes is from chiller 77 through a filter 79, of possibly 10-50 micron size, to trap out all but the very finest particles that may otherwise block the very small coolant passages of the roller electrodes. Inlet and outlet temperature sensors 81 and 82 are in the coolant flow circuit of the welding equipment, to sense both the save low inlet and high outlet operating temperatures. As the conductive liquid may change phase at temperatures below approximately 3 degrees C., the low safe inlet temperature range may be set some several degrees above this. The safe outlet temperatures normally would be in the range of 20°-50° C., and the high safe upper limit may be selected as such. The sensors 81 and 82 may activate an audible and/or visual alarm 84 to advise of either excessive heating or cooling. The sensor may also activate a bypass valve 83, to circulate the coolant via line 85 around the roller electrode in the event of excessive cooling. A bleed valve 86 may bypass this bypass valve 83, to allow limited flow through the roller electrode even when the valve 83 is closed. The inner and outer electrode rollers can have parallel coolant flow hookups, or separate controls and flow lines can be provided for each; although for simplicity, only the flow for the inner roller electrode 22 is illustrated.

Some degree of care is also needed for shipping and/or storing the disclosed roller electrodes, for maintaining them above the lower phase change temperature. Once done, the disclosed roller electrode will otherwise have a very extended, almost unlimited, shelf life. Even should the disclosed conductive liquid thicken, it will only be slushy, not solid, and it may be usable after warming again and returning to the liquid phase. Even where the conductive liquid may be sluggy, the components may be easily disassemblied for recharging with fresh liquid.

The rotor may be made of a copper alloy having approximately 0.3-0.7% Beryllium (Be), 1.5-2.0% Nickel (Ni), with the balance Copper (Cu); or up to possibly 0.3% Cobalt (Co) may be added too. This material has sufficient hardness to withstand the temperatures and pressures associated with the rotor; and adequate conductivity. The stator is not subjected to the same temperature and pressure extremes as the rotor, and may be made up of a copper alloy having approximately 1% Chromium (Cr) and the balance Copper (Cu); being much more conductive than, but not as hard as, the rotor material. The rotor and stator materials, and the more conductive liquid, provide less resistance to the electrical current through the roller electrode, to produce less heat and otherwise a better weid, than obtained with a mercury roller electrode and/or an electrode having the stator made of the same material as the rotor.

The rotor section 47 may alternatively be made of a sintered mixture of tungsten and copper, of the order of 60-70% tungsten (W) and 40-30% copper (Cu). Of great significance, tin does not bond to or buildup on this sintered material, greatly extending the period between, or possibly even eliminating completely the need for, reprofiling the rotor periphery. The sintered rotor section provides uniforn thermal expansion and contraction. The rotor section 46 may be formed of the same sintered material, or may be formed of the copper/alloy.

The sintered tungsten and copper rotor has great resistance against corrosion, up to temperatures of the order of 600° C. It also is structurally durable against mechanical wear, approximately four times better than the typical copper alloy rotor. This reduces the wear of the rotor periphery, including wear of the groove 33, where wear changes of the exterior rotor shape or groove debth adversely reduce the performance and/or operating life of the roller electrode. Although the conductivity of the sintered tungsten and copper rotor is perhaps one-third less than the conventional copper alloy rotor, the improved structural properties and the improved conductivity of the disclosed conductive liquid tend to compensate one another. The overall combination is likely to achieve welding performances comparable to those of the conventional mercury roller electrodes.

An alternative rotor configuration is illustrated in FIG. 7, with the rotor seciton 147 being formed of the sintered tungsten-copper mixture of 60-70% tungsten and 40-30% copper, and having a circumferentially continuous raised rib 132, on the rotor periphery at a location where the intermediate wire electrode groove (like 34) would be. During use then, the rotor rib would directly engage one of the overlapped edges of the can blank; and no intermediate electrode wire (like 32) would be used between the rotor and the can blank 12. This would simplify the conventional electric resistance welder using this type of roller electrode, eliminating the spools of inside and outside intermediate electrode wires, and a multitude of pulleys, tracks or the like for guiding such wires over the roller electrodes.

Other refractory metals, such as molybdenum (Mo), having good electrical conductivity may also be used instead of tungsten, perticularly when balancing the durability against the costs.

Another aspect of the disclosed roller electrodes is the rebuilding program possible with them, providing for greatly increased overall electrodes roller economy. Thus, the stator and rotor components may always be easily disassemblied, for rebuilding and/or recharging the roller electrode. Once the stator and rotor components are separated, they may be reprofiled as needed, and cleaned inside and out. The exposed component faces may be blasted with glass beads, to clean them without removing component material, or with aluminum oxide for removing the more difficult surface impurities. The coolant passages may be cleaned by flushing with an acetic acid, including with abrasive such as glass beads or aluminum oxide. The cleaned components may be reassemblied with new or rebuilt bearings and seals, and recharged with fresh conductive liquid.

Some inner roller electrodes 22 of the disclosed design, have operated in-the-field to weld in excess of 19 million cans, on conventional electric resistance welders.

What I claim is:

1. For use in electric resistance seam welding apparatus adapted to weld overlapped metal edges, an improved roller electrode having stator and rotor components, the stator and rotor components having annular surfaces spaced apart across thin gaps, bearing means for mounting said rotor to rotate relative to said stator with movement via said gaps, a conductive liquid simultaneously contacting said annular surfaces to electrically conduct a welding current across said gaps between the components, said rotor and stator being formed of different materials, said rotor being formed of a copper alloy having approximately 0.3-0.7% Beryllium (Be), 1.5-2.0% Nickel (Ni), with the balance Copper (Cu), thereby being durable under high temperatures and pressures, and electrically and thermally conductive; and said stator being formed of a copper alloy having approximately 1% Chromium (Cr) and the balance Copper (Cu), thereby having less durability under high temperatures and pressures, but having greater electrical and thermal conductivity than the rotor.

2. A roller electrode combination according to claim 1, further wherein the conductive liquid is of a composite eutectic mixture of gallium (Ga), indium (In), tin (Sn) and zinc (Zn), by weight, being substantially 61% Ga, 25% In, 13% Sn, and 1% Zn.

3. For use in electric resistance seam welding apparatus adapted to weld overlapped edges of a metal blank curved over a full 360 degrees to a tubular configuration, an improved roller electrode having stator and rotor components, the stator and rotor components having annular surfaces spaced apart across thin gaps, bearing means for mounting said rotor to rotate relative to said stator with movement via said gaps, a conductive liquid simultaneously contacting said annular surfaces to electrically conduct a welding current across said gaps between the components, the roller electrode being adapted to be disposed inside of the tubular configuration and said rotor having an exterior peripheral face adapted to cooperate with the overlapped edges of the blank and said exterior peripherial face being opposite portions of said annular rotor surfaces, a protective coating being formed on said portions of the annular rotor surfaces, said protective coating being of the order between 0.0025 and 0.025 millimeters thick and being of gold (Au) plated directly on the surfaces of the rotor and rhodium (Rh) plated on the gold, and said conductive liquid being of a composite eutectic mixture of gallium (Ga), indium (In), tin (Sn) and zinc (Zn), by weight, being substantially 61% Ga, 25% In, 13% Sn, and 1% Zn.

4. For use in electric resistance seam welding apparatus adapted to weld overlapped metal edges, an improved roller electrode having stator and rotor components, the stator and rotor components having annular surface spaced apart across thin gaps, bearing means for mounting said rotor to rotate relative to said stator with movement via said gaps, a conductive liquid simultaneously contacting said annular surfaces to electrically conduct a welding current across said gaps between the components, a protective coating formed only on said annular rotor surfaces and the annular stator surfaces being without any protective coating, said protective coating being of the order between 0.0025 and 0.025 millimeters thick, and said protective coating being of gold (Au) plated directly on the said annular rotor surfaces and material from the platinum (Pt) family then being plated on the gold.

5. For use in electric resistance seam welding apparatus adapted to weld overlapped metal edges, an improved roller electrode having stator and rotor components, the stator and rotor components having annular surfaces spaced apart across thin gaps, bearing means for mounting said rotor to rotate relative to said stator with movement via said gaps, a conductive liquid simultaneously contacting sad annular surfaces to electrically conduct a welding current across said gaps between the components, a protective coating formed only on said annular rotor surfaces and the annular stator surfaces being without any protective coating, said protective coating being of the order between 0.0025 and 0.025 millimeters thick, and said protective coating being of gold (Au) plated directly on the annular rotor surfaces and rhodium (Rh) plated then on the gold.

6. For use in electric resistance seam welding apparatus adapted to weld overlapped metal edges, an improved roller electrode having stator and rotor components, the stator and rotor components having annular surfaces spaced apart across thin gaps, bearing means for mounting said rotor to rotate relative to said stator with movement via said gaps, a conductive liquid simultaneously contacting said annular surfaces to electrically conduct a welding current across said gaps between a components, a protective coating formed only on said annular rotor surfaces and the annular stator surfaces being without any protective coating, said protective coating being of the order between 0.0025 and 0.025 millimeters thick, said protective coating being of gold (Au) plated directly on the said annular rotor surfaces and material from the platinum (Pt) family then being plated on the gold, and said rotor and stator being formed of different materials, said rotor being formed of a material durable under high temperatures and pressures, and electrically and thermally conductive; and said stator being formed of a material having less durability under high temperatures and pressures, but having greater electrical and thermal conductivity, than the material forming the rotor.

7. A roller electrode combination according to claim 6, further wherein said rotor material is a copper alloy having approximately 0.3–0.7% Beryllium (Be), 1.5–2.0% Nickel (Ni), with the balance Copper (Cu); and said stator material is a copper alloy having approximately 1% Chromium (Cr) and the balance Copper (Cu).

8. A roller electrode combination according to claim 6, further wherein said rotor has an exterior peripherial face adapted to be closely adjacent the overlapped edges of the blank; certain of said annular surfaces of the rotor being opposite to the peripherial rotor face, and the rotor in this region between said certain annular surfaces and the peripherial face being structural and being formed only of a composite sintered mixture of copper (Cu) and tungsten (W), in the range of 60–70% tungsten and 40–30% copper, by weight.

9. For use in electric resistance seam welding apparatus adapted to weld overlapped metal edges, an improved roller electrode having stator and rotor components, the stator and rotor components having annular surfaces spaced apart across thin gaps, bearing means for mounting said rotor to rotate relative to said stator with movement via said gaps, a conductive liquid simultaneously contacting said annular surfaces to electrically conduct a welding current across said gaps between the components, a protective coating formed only on said annular rotor surfaces and the annular stator surfaces being without any protective coating, said protective coating being of the order between 0.0025 and 0.025 millimeters thick, said protective coating being of gold (Au) plated directly on the annular rotor surfaces and rhodium (Rh) then being plated on the gold, and said electrically conductive liquid being of a composite eutectic mixture of gallium (Ga), indium (In), tin (Sn) and zinc (Zn), by weight, being substantially 61% Ga, 25% In, 13% Sn, and 1% Zn.

10. For use in electric resistance seam welding apparatus adapted to weld overlapped metal blank edges, an improved roller electrode having stator and rotor components, the stator and rotor components having annular surfaces spaced apart across thin gaps, bearing means for mounting said rotor to rotate relative to said stator with movement via said gaps, a conductive liquid simultaneously contacting said annular surfaces to electrically conduct a welding current across said gaps between the components, a protective coating formed on certain of said annular rotor surfaces that would contact the conductive liquid, said protective coating being of the order between 0.0025 and 0.025 millimeters thick and being of gold (Au) plated directly on the annular rotor surfaces and of material from the platinum (Pt) family then being plated on the gold, and said conductive liquid being mercury (Hg).

11. A roller electrode combination according to claim 4, wherein the platinum family material of the protective coating is iridium (Ir), and it is plated on the gold (Au).

12. For use in electric resistance seam welding apparatus adapted to weld overlapped edges of a metal blank curved over a full 360 degrees to a tubular configuration, improved inside and outside roller electrodes adapted to oppose one another at the overlapped edges of the blank;
 the respective inside and outside roller electrodes each having stator and rotor components, the respective stator and rotor components each having annular surfaces spaced apart across thin gaps, bearing means for mounting said rotor to rotate relative to said stator with movement via said gaps, and a conductive liquid simultaneously contacting said annular surfaces to electrically conduct a welding current across said gaps between the components;
 the inside roller electrode being adapted to be disposed inside of the tubular configuration and said rotor having an exterior peripherial face adapted to cooperate with the overlapped edges of the blank and said exterior peripherial face being opposite portions of said annular rotor surfaces, a protective coating being formed on said portions of the annular rotor surfaces, said protective coating being of the order between 0.0025 and 0.025 millimeters thick and being of gold (Au) plated directly on the surfaces of the rotor and rhodium (Rh) plated on the gold;
 the outside roller electrode being adapted to be disposed outside of the tubular configuration and said rotor having an exterior peripherial face adapted to cooperate with the overlapped edges of the blank, opposide the inside roller electrode; and
 the respective inside and outside roller electrodes each having said conductive liquid being of a composite eutectic mixture of gallium (Ga), indium (In), tin (Sn) and zinc (Zn), by weight, being substantially 61% Ga, 25% In, 13% Sn, and 1% Zn.

13. For use in electric resistance seam welding apparatus adapted to weld overlapped metal blank edges, an improved roller electrode having stator and rotor components, the stator and rotor components having annular surfaces spaced apart across thin gaps, bearing means for mounting said rotor to rotate relative to said stator with movement via said gaps, a conductive liquid simultaneously contacting said annular surfaces to electrically conduct a welding current across said gaps between the components, a protective coating formed on certain of said annular rotor surfaces, said protective coating being of the order between 0.0025 and 0.025 millimeters thick, and said protective coating being of gold (Au) or material from the platinum (Pt) family.

14. A roller electrode combination according to claim 13, wherein the platinum family material of the protective coating is iridium (Ir), and it is plated directly on the annular rotor surfaces.

15. A roller electrode combination according to claim 13, wherein said protective coating is gold (Au) plated directly on the annular rotor surfaces, and the platinum family material being plated on the gold (Au).

16. A roller electrode combination according to claim 15, wherein the platinum family material of the protective coating is rhodium (Rh).

17. A roller electrode combination according to claim 15, wherein the platinum family material of the protective coating is iridium (Ir).

18. A roller electrode combination according to claim 13, further wherein the platinum family material of said protective coating is rhodium (Rh), and the protective coating is of rhodium plated directly on the annular rotor surfaces.

19. A roller electrode combination according to claim 13, further wherein said rotor has an exterior peripherial face adapted to cooperate closely adjacent the overlapped metal edges during welding; certain of said annular surfaces of the rotor being opposite to the peripherial rotor face; and said protective coating being formed on those certain annular rotor surfaces opposite to the peripherial rotor face.

20. A roller electrode combination according to claim 14, further wherein said conductive liquid is of a composite eutectic mixture of gallium (Ga), indium (In), tin (Sn) and zinc (Zn), by weight, being substantially 61% Ga, 25% In, 13% Sn, and 1% Zn.

21. For use in electric resistance seam welding apparatus adapted to weld overlapped metal edges, an improved roller electrode having stator and rotor components, and stator and rotor components having annular surfaces spaced apart across thin gaps, bearing means for mounting said rotor to rotate relative to said stator with movement via said gaps, a conductive liquid simultaneously contacting said annular surfaces to electrically conduct a welding current across said gaps between the components, said rotor having an exterior peripherial face adapted to be closely adjacent the overlapped metal edges during welding, certain of said annular surfaces of the rotor being opposite to the peripherial rotor face, and the rotor specifically in the region radially between said certain annular surfaces and the peripherial face being formed only of a composite sintered mixture of copper (Cu) and tungsten (W), in the range of 60–70% tungsten and 40–30% copper, by weight.

22. For use in electric resistance seam welding apparatus adapted to weld overlapped metal edges, an improved roller electrode having stator and rotor components, the stator and rotor components having annular surfaces spaced apart across thin gaps, bearing means for mounting said rotor to rotate relative to said stator with movement via said gaps, a conductive liquid simultaneously contacting said annular surfaces to electrically conduct a welding current across said gaps between the components, said rotor having an exterior peripherial face adapted to be closely adjacent the overlapped metal edges during welding, passage means in the rotor for a thermally conductive, said passage means being spaced from the peripherial rotor face and the rotor specifically in the region radially between said peripherial face and the rotor passage means being formed only of a composite sintered mixture of copper (Cu) and tungsten (W), in the range of 60–70% tungsten and 40–30% copper, by weight.

* * * * *

REEXAMINATION CERTIFICATE (1349th)
United States Patent [19]
Davies

[11] B1 4,780,589
[45] Certificate Issued  Sep. 4, 1990

[54] ROLLER ELECTRODES FOR ELECTRIC-RESISTANCE WELDING MACHINE

[76] Inventor: Joseph R. Davies, 220 W. Haven, New Lenox, Ill. 60451

Reexamination Request:
No. 90/001,821, Aug. 10, 1989

Reexamination Certificate for:
Patent No.: 4,780,589
Issued: Oct. 25, 1988
Appl. No.: 53,375
Filed: May 22, 1987

[51] Int. Cl.$^5$ .......................................... B23K 11/06
[52] U.S. Cl. ........................................ 219/84; 219/64
[58] Field of Search .................... 219/84, 64, 81, 82

Primary Examiner—Leo P. Picard

[56] References Cited

U.S. PATENT DOCUMENTS

| | | |
|---|---|---|
| 3,368,950 | 2/1968 | D.G. Levine et al. |
| 4,317,704 | 3/1982 | McIntyre et al. |
| 4,368,372 | 1/1983 | Habenicht et al. |
| 4,642,437 | 2/1987 | Yamamoto et al. |
| 4,782,207 | 11/1988 | Masuda et al. |

FOREIGN PATENT DOCUMENTS 2805340  8/1979  Fed. Rep. of Germany.

OTHER PUBLICATIONS

Metall Publication (1955) Dr. H. Spengler.

[57] ABSTRACT

A roller electrode combination for use in electric-resistance welder, the electrode having relatively rotatable components separated by very small gaps, and a liquid contained by the components across the gaps; where said liquid is nontoxic, and is highly conductive, both electrically and thermally. The conductive liquid is of a composite eutectic mixture of gallium (Ga), indium (In), tin (Sn) and zinc (Zn), by weight, being approximately 61% Ga, 25% In, 13% Sn, and 1% Zn. A protective coating of the order between 0.0025 and 0.025 millimeters thick is plated on said surfaces of at least one of the components, being of material from the platinum family, such as rhodium (Rh). Coolant is circulated through one of the components; and part of the component is formed of a composite mixture of copper (Cu) and tungsten (W). That one component further may have a circumferentially continuous raised rib, on the exterior peripheral face adapted to be closely adjacent and directly engage at least the adjacent of the overlapped edges of the material to be welded.

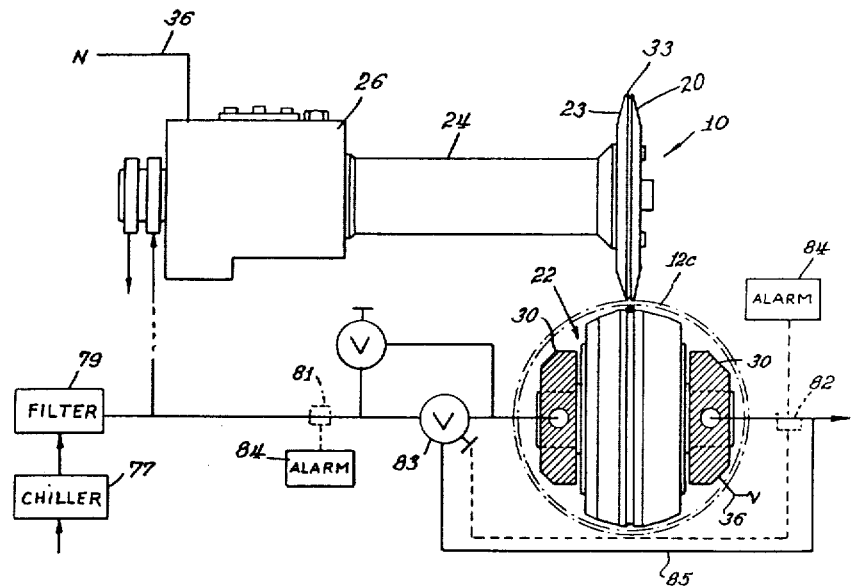

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-22 is confirmed.

* * * * *